(12) United States Patent
Shoemaker et al.

(10) Patent No.: US 7,731,262 B2
(45) Date of Patent: Jun. 8, 2010

(54) CLOSURE DAMPER ASSEMBLY

(75) Inventors: James H. Shoemaker, White Lake, MI (US); Paul R. Meernik, Redford, MI (US); Scott W. Thorpe, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 97 days.

(21) Appl. No.: 12/265,144

(22) Filed: Nov. 5, 2008

(65) Prior Publication Data

US 2010/0109371 A1    May 6, 2010

(51) Int. Cl.
*B62D 25/10* (2006.01)
(52) U.S. Cl. ........................................... 296/76
(58) Field of Classification Search ............... 296/56, 296/76, 106, 146.8; 49/339, 340
See application file for complete search history.

(56) References Cited

U.S. PATENT DOCUMENTS

| 4,688,844 | A  | * | 8/1987  | Hirose et al.  | 296/76    |
| 6,892,423 | B2 | * | 5/2005  | Cheal et al.   | 16/289    |
| 7,028,798 | B2 | * | 4/2006  | Castellon      | 180/69.21 |
| 7,596,833 | B2 | * | 10/2009 | Erwin          | 16/370    |

* cited by examiner

*Primary Examiner*—Lori L Lyjak

(57) ABSTRACT

A closure assembly for a vehicle pivotable between a closed position and a full open position, and a method of controlling its movement includes a closure, a hinge mechanism attached to the closure, and a damper assembly. The damper assembly includes a damper actuator and a pneumatic closure damper, with the closure damper including a hollow bellows extending from a support base, an orifice and an end opposite the support base. The damper actuator is attached to the hinge mechanism and the support base is attached to the body structure such that the damper actuator is spaced from the end when the closure is in the closed position and the damper actuator is in contact with the end and compresses the bellows when the closure is in the full open position.

16 Claims, 2 Drawing Sheets

CLOSURE DAMPER ASSEMBLY

BACKGROUND OF INVENTION

The present invention relates generally to vehicle closures and more particularly to a damper for a vehicle closure.

Often, vehicle closures that pivot vertically have some type of assist mechanism to help an operator raise the closure. For example, a vehicle may have a trunk with a deck lid that pivots upward to provide access to the trunk. Gooseneck or single pivot type hinge systems may support the deck lid and may employ extension springs, torque rods, torsion springs or other types of spring mechanisms to assist in raising the deck lid to its full open position. The springs are sized to overcome the mass of the closure and friction, so a substantial amount of energy must be dissipated when the closure reaches the full up position. Rubber bumpers have been employed to account for this energy, but generally do not absorb the energy without causing a rebound, thus causing the closure to bounce. This bounce can result in poor perceived quality for the closure. Another solution is to employ hydraulic struts that control the rate of movement, but they may be too expensive for some applications and may take up more packaging space than is desirable.

SUMMARY OF INVENTION

An embodiment contemplates a closure assembly for a vehicle pivotable between a closed position and a full open position. The closure assembly may include a closure, a hinge mechanism attached to the closure and pivotally attached to the body structure, and a damper assembly. The damper assembly may include a damper actuator and a pneumatic closure damper, with the closure damper including a hollow, elastomeric bellows extending from a support base, an orifice extending from internal to the bellows to atmosphere and an unconstrained end opposite the support base. One of the damper actuator and the support base is attached to the hinge mechanism and the other of the damper actuator and the support base is attached to the body structure such that the damper actuator is spaced from the unconstrained end when the closure is in the closed position and the damper actuator is in contact with the end and compresses the bellows when the closure is in the full open position.

An embodiment contemplates a method of controlling pivotal movement of a closure on a vehicle between a closed position and a full open position, the method comprising the steps of: providing a biasing torque on the closure that biases the closure toward the full open position; moving the closure from the closed position to a partially open position without applying a damping force to the closure; moving the closure from the partially open position to the full open position; and, during the movement from the partially open position to the full open position, applying a damping force in an opposed direction to the biasing torque.

An advantage of an embodiment is the closure damper assembly absorbs the energy to stop the closure at its fully up position, while reducing or eliminating any bounce in the closure at the end of travel. In addition, the closure damper assembly takes up minimal packaging space and is relatively inexpensive.

DETAILED DESCRIPTION

Figure 1:
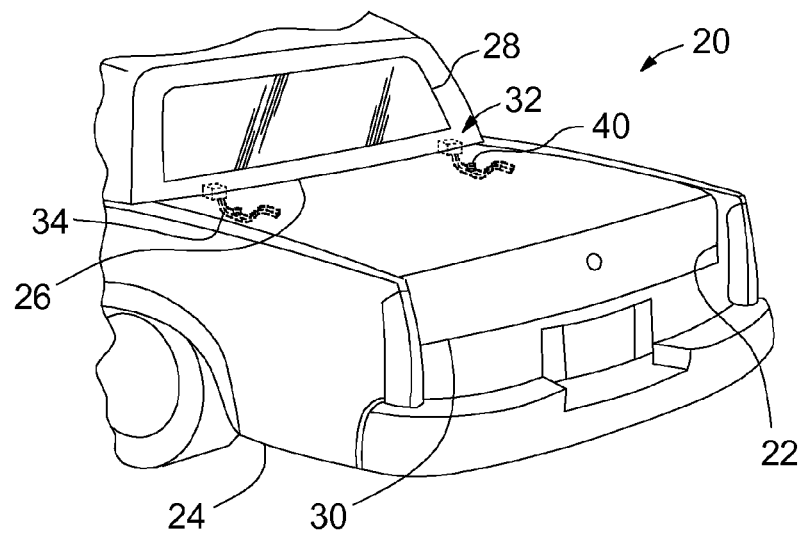
FIG. 1 is a schematic perspective view of a rear portion of a vehicle, with a portion of a closure damper assembly shown.

FIG. 1 schematically illustrates a rear portion of a vehicle 20 having a trunk opening 22 defined partially by a pair of rear quarter panels 24 and laterally extending vehicle body structure 26 located adjacent to a rear window 28 of the vehicle 20. A vehicle closure, such as a deck lid 30, shown in its closed position, covers the trunk opening 22. A pair of hinge assemblies 32 mount to the body structure 26 and each includes a hinge strap 34 that is secured to the deck lid 30 and can pivot relative to the body structure 26. Also, a portion of a pair of damper assemblies 40 is shown.

Figure 2:
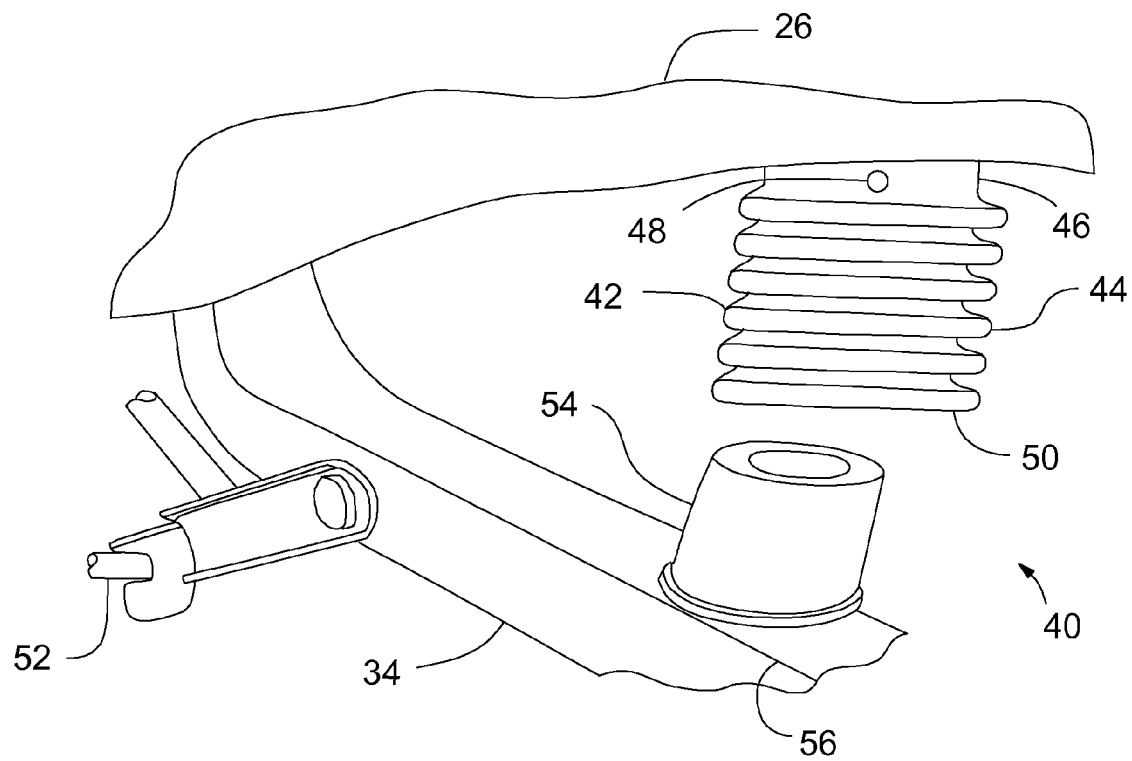
FIG. 2 is a perspective view of a portion of a hinge strap and closure damper, with the closure damper in an extended position.
Figure 3:
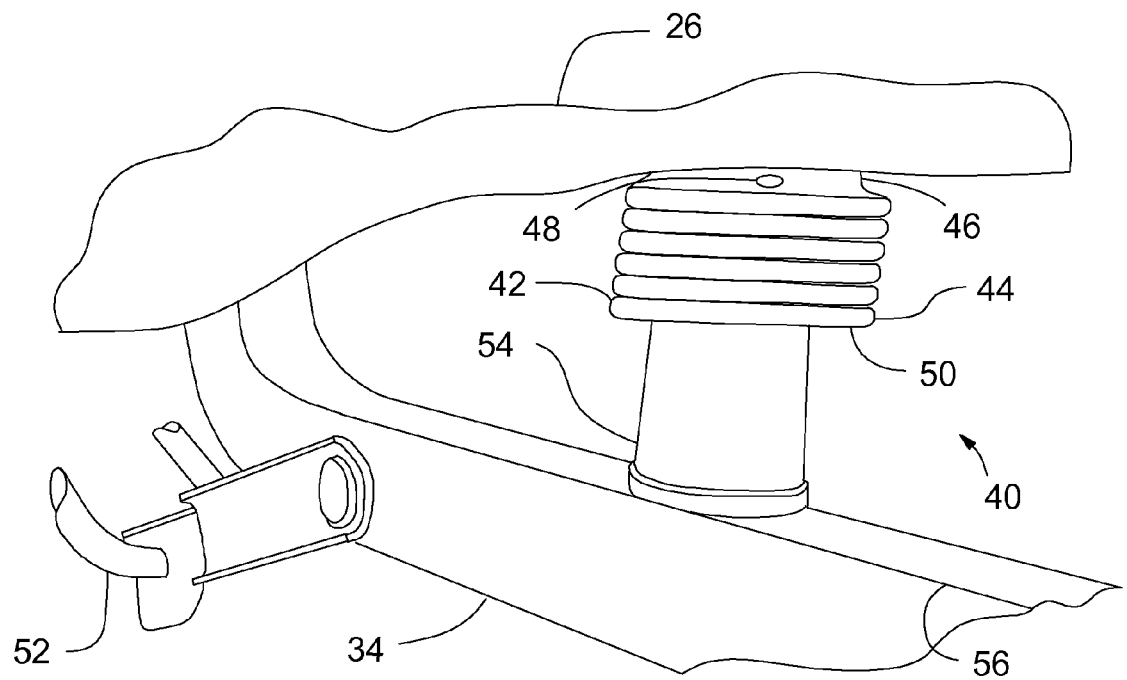
FIG. 3 is a perspective view of the hinge strap, but with the closure damper compressed to a retracted position.

FIGS. 2 and 3 illustrate one of the damper assemblies 40 and its interaction with the vehicle in more detail. The damper assembly 40 includes a pneumatic closure damper 42 that has a hollow bellows 44 and a support base 46 extending from the bellows 44 that is mounted to the vehicle body structure 26. The pneumatic closure damper 42 also includes an orifice 48 extending through a wall of the closure damper 42 to regulate the flow of air into and out of the bellows 44. The closure damper 42 may be formed of a molded rubber or other suitable elastomeric material that allows it to be compresses and then return to its original shape.

The bellows 44 is located so that one of the hinge straps 34 extends along the unconstrained end 50 of the bellows 44. The hinge strap 34 may have a torsion bar assembly 52, or other biasing mechanism, attached to it. The damper assembly 40 also includes a damper actuator 54, which is mounted to a surface 56 of the hinge strap 34 that faces the bellows 44. The damper actuator 54 is positioned so that it aligns with the unconstrained end 50 of the bellows 44 and is spaced from the end 50 of the bellows 44 until the closure is near its full open position.

The operation of the deck lid 30 and damper assemblies 40 will now be discussed. When the deck lid 30 is in its closed position, the damper actuators 54 are spaced from the respective ends 50 of the closure dampers 42. As the deck lid 30 begins to swing toward its full open position, the damper actuators 54 remain spaced from the closure dampers 42 (as shown in FIG. 2). Thus, there is no damping effect counteracting the opening force provided by the torsion bar assembly 52. As the deck lid 30 reaches a point where it is almost fully opened, the damper actuators 54 contact the respective ends 50 of the bellows 44. Continued movement toward the closed position will cause the damper actuators 54 to compress the respective bellows 44. The elastic deformation of the bellows 44 and the restriction of air flow through the orifices 48 provide a force that counteracts the torque from the torsion bar assembly 52. Thus, the compression of the bellows 44 slows the movement of the hinge straps 34 until the bellows 44 are fully compressed, at which point the deck lid 30 has reached its full open position (as shown in FIG. 3).

As the deck lid 30 is brought back to its closed position, the bellows 44 extend back to their original height, drawing air back in through the orifices 48, thus being ready for the next deck lid opening event.

Consequently, the damper assemblies 40 provide a smooth transition from a free rise portion of a deck lid opening event to a full open position, without deck lid bounce back. The size, configuration and placement of the orifices 48 can be modified as needed to obtain the desired rate of air flow out of the bellows 44, with accurate flow control that has little sensitivity to temperature. In addition, the height and volume of the bellows 44 can be modified as needed to obtain the desired damping characteristics.

Figure 4:
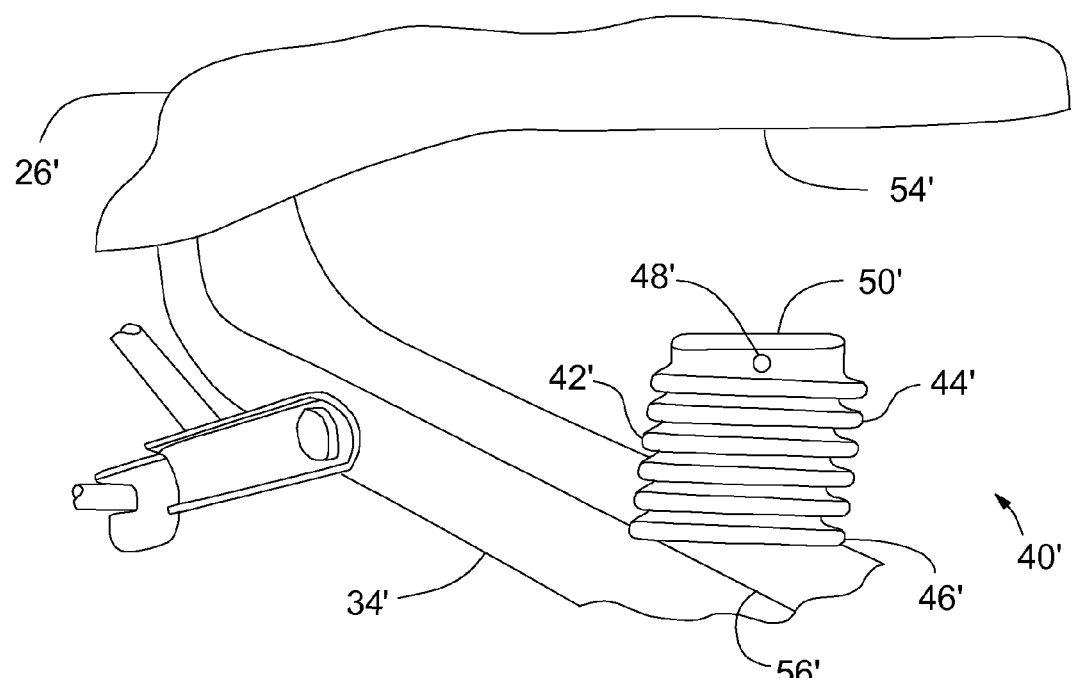
FIG. 4 is a perspective view similar to FIG. 2, but illustrating a second embodiment of the invention.

FIG. 4 illustrates a second embodiment. In this embodiment, the pneumatic closure damper 42' includes a support base 46' that is mounted to the surface 56' of the hinge strap 34'. The bellows 44' extend from this base 46' toward an unconstrained end 50' that faces the vehicle body structure 26'. A portion of the vehicle body structure 26' now forms the damper actuator 54' that presses against the unconstrained end 50' when the closure is near or in its full open position. The closure damper 42' still includes the orifice 48' that controls air flow out of and into the bellows 44'.

In another alternative, the closure damper may be mounted to the vehicle body structure similar to the first embodiment, but with the surface of the hinge strap actually forming the damper actuator rather than having a separate member that extends above the hinge strap surface.

While the closure illustrated herein is a deck lid 30, the invention is applicable to other types of vehicle closures that pivot up vertically to open or close. In addition, different types of hinge mechanisms may be employed for pivotally attaching the closure to the vehicle. And, as mentioned above, different types of biasing mechanisms, other than a torsion bar assembly 52, may be employed for biasing the closure toward its open position. Thus, while certain embodiments of the present invention have been described in detail, those familiar with the art to which this invention relates will recognize various alternative designs and embodiments for practicing the invention as defined by the following claims.

What is claimed is:

1. A closure assembly, pivotable between a closed position and a full open position, for a vehicle having a body structure comprising:
   a closure;
   a hinge mechanism attached to the closure and pivotally attached to the body structure; and
   a damper assembly including a damper actuator and a pneumatic closure damper, the closure damper including a hollow, elastomeric bellows extending from a support base, an orifice extending from internal to the bellows to atmosphere and an unconstrained end opposite the support base, with one of the damper actuator and the support base attached to the hinge mechanism and the other of the damper actuator and the support base attached to the body structure such that the damper actuator is spaced from the unconstrained end when the closure is in the closed position and the damper actuator is in contact with the unconstrained end and compresses the bellows when the closure is in the full open position.

2. The closure assembly of claim 1 including a torsion bar assembly operatively engaging the hinge mechanism and the body structure such that the torsion bar assembly biases the closure toward the full open position.

3. The closure assembly of claim 1 wherein the closure is a deck lid.

4. The closure assembly of claim 1 wherein the bellows are made of rubber.

5. The closure assembly of claim 1 wherein the orifice is sized to provide a predetermined flow rate of air from the bellows as the damper actuator contacts the unconstrained end and compresses the bellows.

6. The closure assembly of claim 1 wherein the hinge mechanism is a goose neck hinge mechanism.

7. The closure assembly of claim 1 including a biasing mechanism operatively engaging the hinge mechanism and the body structure such that the biasing mechanism biases the closure toward the full open position.

8. The closure assembly of claim 1 wherein the damper actuator is mounted on and pivots with the hinge mechanism and the support base is mounted to the body structure.

9. The closure assembly of claim 1 wherein the damper actuator is a portion of the body structure and the support base is mounted to the hinge mechanism.

10. The closure assembly of claim 1 wherein the damper actuator is a surface on an arm of the hinge mechanism and the support base is mounted to the body structure.

11. A method of controlling pivotal movement of a closure on a vehicle between a closed position and a full open position, the method comprising the steps of:
    (a) providing a biasing torque on the closure that biases the closure toward the full open position;
    (b) moving the closure from the closed position to a partially open position without applying a damping force to the closure;
    (c) moving the closure from the partially open position to the full open position; and
    (d) during the movement from the partially open position to the full open position, applying a damping force in an opposed direction to the biasing torque.

12. The method of claim 11 wherein step (d) is further defined by the damping force being created by a damper actuator mounted on a hinge mechanism compressing a hollow, elastomeric bellows mounted on a body structure.

13. The method of claim 12 wherein step (d) is further defined by the bellows including an orifice, with the orifice allowing a controlled air flow from the bellows as the damper actuator compresses the bellows.

14. The method of claim 12 wherein step (b) is further defined by the damper actuator being spaced from the bellows while the closure is moving from the closed position to the partially open position.

15. The method of claim 12 including step (e) expanding the bellows to a fully extended position when the closure moves from the full open position to the closed position.

16. The method of claim 11 wherein step (a) is further defined by employing a torsion bar assembly to create a biasing torque on the closure that biases the closure toward the full open position.

* * * * *